Feb. 4, 1941.       L. KLEIN       2,230,802
SHEET MATERIAL CUTTER
Filed April 17, 1940      3 Sheets-Sheet 1

WITNESSES

INVENTOR
Louis Klein
BY
ATTORNEYS

Feb. 4, 1941. L. KLEIN 2,230,802
SHEET MATERIAL CUTTER
Filed April 17, 1940 3 Sheets-Sheet 2

INVENTOR
Louis Klein
BY
Munn, Anderson & Liddy
ATTORNEYS

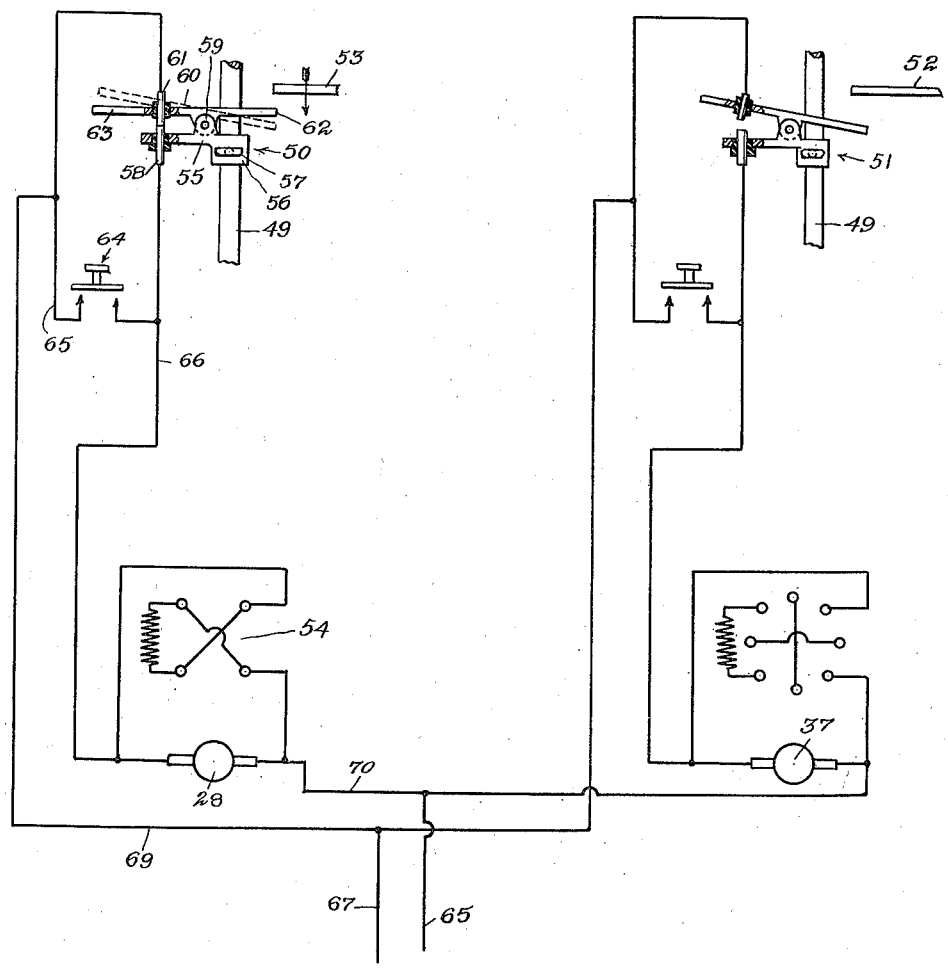

Patented Feb. 4, 1941

2,230,802

UNITED STATES PATENT OFFICE 2,230,802

SHEET MATERIAL CUTTER

Louis Klein, New York, N. Y.

Application April 17, 1940, Serial No. 330,107

2 Claims. (Cl. 164—27)

This invention relates to sheet material cutters and particularly to an improved cutter for cutting cloth so as to produce garment blanks, an object being to provide a construction wherein complete blanks may be formed by one cutting or stamping operation.

Another object of the invention is to provide a machine wherein the cutters are formed in the shape of the blanks to be cut, together with means for moving the cutters up and down so as to function to cut through a pile of fabric and then be withdrawn ready for a second operation.

An additional object of the invention is to provide a machine for cutting garment blanks which may be adjusted to cut blanks of any desired garment and when functioning to cut either one blank or a large number of blanks ready to be stitched together to complete the garment.

In the accompanying drawings—

Fig. 5 illustrates a wiring diagram, power motors, and controlling structures therefor.

Referring to the accompanying drawings by numerals, 1 indicates a support of any kind, as for instance, an ordinary cutting table such as now commonly used. As is now the practice, the fabric to be cut into garment blanks is placed on a table similar to table 1 and folded back and forth to make what is known as a pile. This pile of fabric may be a few feet long or a hundred feet long. Usually the pile is slightly shorter than the length of the table. After the desired number of layers of fabric have been provided, wooden patterns or other stiff patterns are placed on the piled fabric and arranged so that the largest number of patterns possible may be used but with a small space therebetween. Weights are usually applied to the patterns and then a cutter having a vertically movable knife is used to cut around the patterns.

Figures 1, 2:
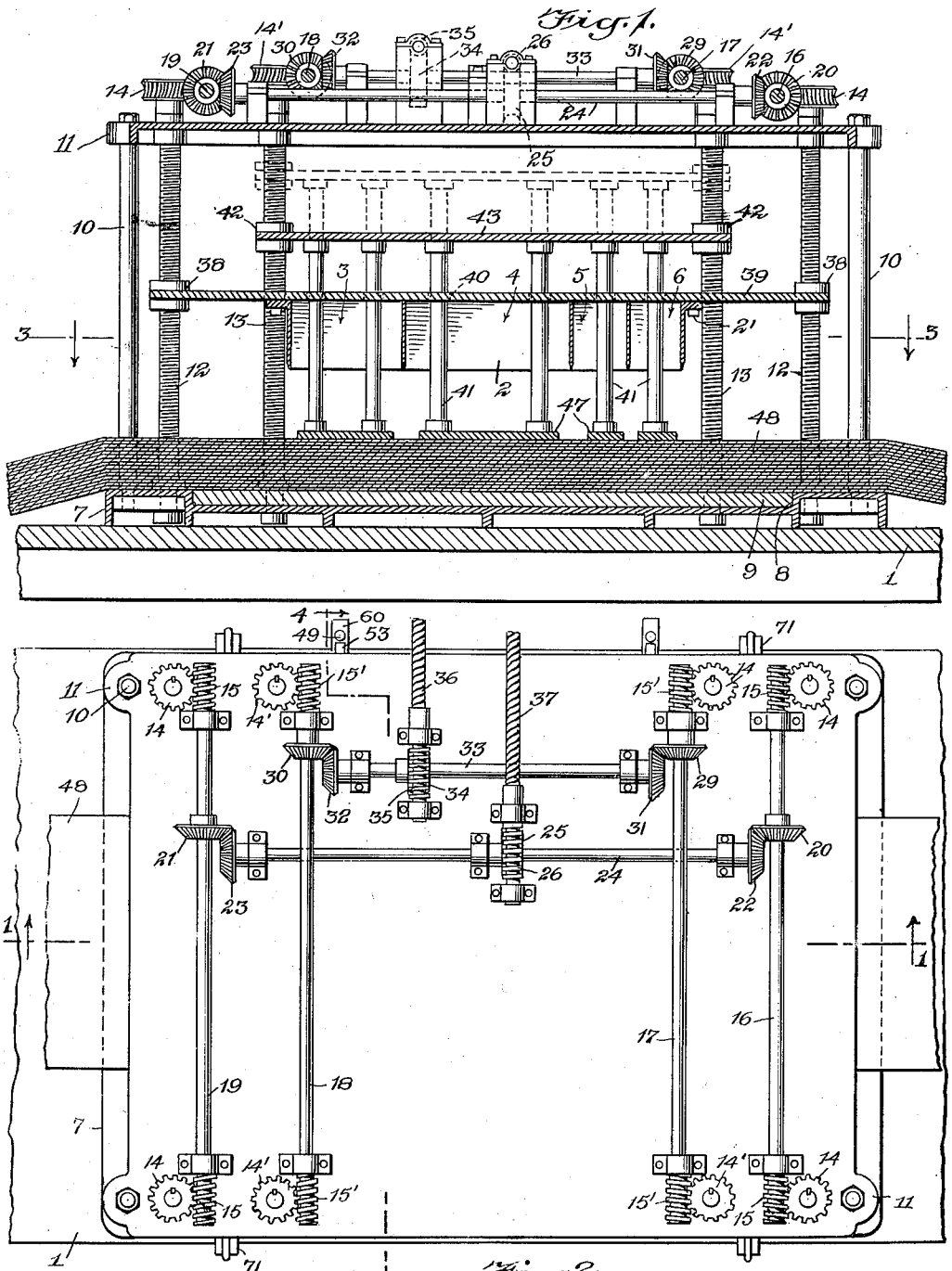
Fig. 1 is a longitudinal sectional view through Fig. 2 approximately on the line 1—1, the same disclosing an embodiment of the invention.
Fig. 2 is a top plan view of the machine shown in Fig. 1.
Figure 3:
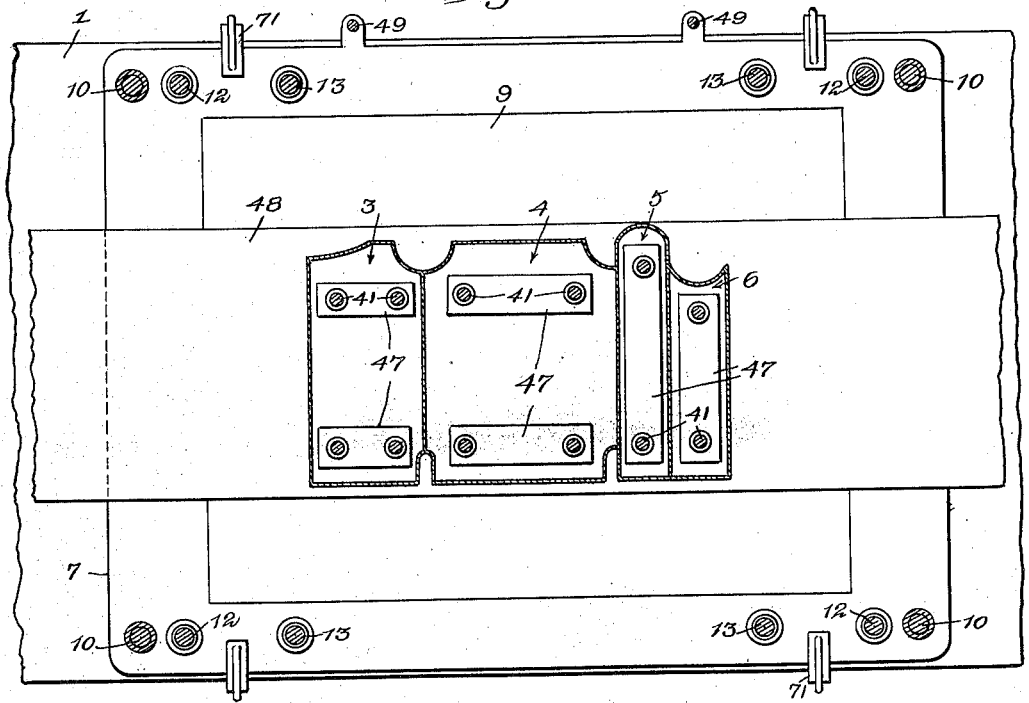
Fig. 3 is a sectional view through Fig. 1 approximately on the line 3—3.
Figure 4:
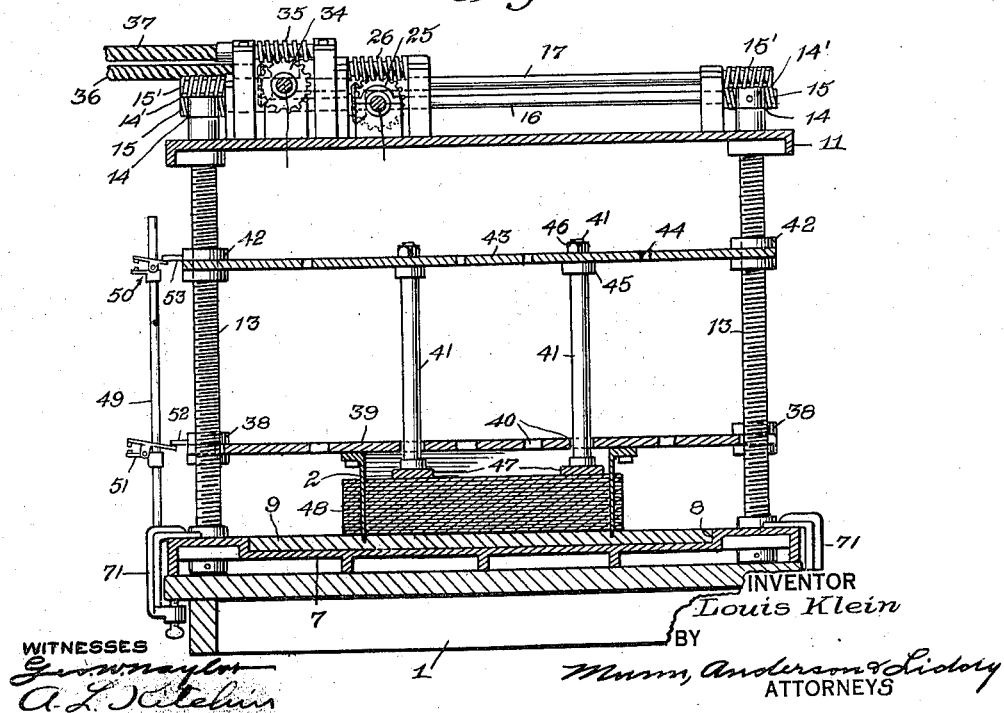
Fig. 4 is a transverse sectional view through Fig. 2 approximately on the line 4—4.

In the present invention, instead of patterns being arranged on the piled fabric, the piled fabric is placed in a machine, as shown in Fig. 1, and then the machine is operated, whereby the various cutters 2 will move downwardly to the position shown in Fig. 4. The cutters 2 are of the same shape as the garment blanks so that when the piled fabric has been cut, as shown in Fig. 4, the cutting operation is completed. In Fig. 3 blanks 3, 4, 5 and 6 have been illustrated. These blanks are parts of a shirt structure but they could be blanks of any desired garment.

In order that the machine may function properly, it is provided with a base 7, preferably made of metal and having a recess 8 in which a pallet 9 is positioned. The pallet 9 may be formed of wood, Bakelite, or other material, into which the edges of the cutters 2 may enter, as shown in Fig. 4, so as to be sure that all the layers of piled fabric have been cut. A plurality of corner posts 10 of any desired structure are threaded into the base 7 or otherwise secured thereto and bolted or otherwise secured to the top plate 11 so as to make a complete frame in which the various movable parts function. As indicated in Fig. 3, there are four outer threaded posts 12 and four inner threaded posts 13. All these posts are rotatably connected with the base 7 and extend through suitable openings in the top plate 11. At the upper end each post 12 and 13 is provided with a worm wheel 14 which is rigidly secured thereto. A worm 15 meshes with each worm wheel 14 and, as shown in Fig. 2, the worms 15 are arranged in pairs and are connected together by the respective shafts 16, 17, 18 and 19. Bevel gears 20 and 21 are connected to the respective shafts 18 and 19 and continually mesh with the respective gear wheels 22 and 23 which are rigidly secured to a drive shaft 24. A worm wheel 25 is rigidly secured to shaft 24 and continually meshes with a power worm 26 which is secured to a flexible power shaft 27. Power shaft 27 is connected with an electric power motor 28, as shown in Fig. 5. Shafts 17 and 18, as shown in Fig. 2, have bevel gears 29 and 30 rigidly secured thereto and positioned to continually mesh with bevel gears 31 and 32 rigidly secured to shaft 33. A worm wheel 34 is rigidly secured to shaft 33 and continually meshes with a power worm 35 which is rigidly secured to a flexible power shaft 36 driven by a motor 37, as shown in Fig. 5. By reason of the construction just described, power is transmitted to the threaded post 12 from motor 28, while power is transmitted to the threaded post 13 by motor 37. These motors may be caused to function at the same time or at different times.

On each of the threaded posts 12 there is provided a traveling nut 38 which may be integral with or rigidly secured to the cutter support 39. Support 39 may be a piece of metal provided with numerous perforations 40 through which the various pressure posts 41 loosely extend. Whenever motor 28 is functioning the traveling nuts 38 will be moving upwardly or downwardly and, consequently, will be moving the cutters 2 upwardly or downwardly according ot the direction of movement of the motor. It will be readily seen that when the cutter has been moved down to the position shown in Fig. 4, the power to the motor is cut off and then the motor reversed, whereby the cutter is elevated to the position shown in Fig. 1 or to some other upper position. A traveling nut 42 is carried by each of the threaded posts 14 and is rigidly secured to or formed integral with a weight support 43, which is preferably a piece of strong sheet metal having numerous perforations 44 to receive the reduced extensions of posts 41, as shown in Fig. 4. Each of the posts 41 is provided with a stop or abutment 45 and the extensions are threaded for receiving the respective nuts 46, whereby the posts may be rigidly clamped to the weight support 43. When motor 37 is functioning the weight support 43 is moving upwardly or downwardly according to the direction of movement of the motor. When the motor moves the weight support downwardly the parts will eventually assume the position shown in Fig. 1, wherein the pressing members 47 connected to the lower ends of the posts 41 will press the piled fabric 48 tightly against the pallet 9. The pressing members 47 may be of the same shape as the cutters 2 or may be merely rectangular as shown in Fig. 3. While the pressing members 47 may be of various shapes the cutters 2 must be of the exact shape of the blank to be cut. The cutters 2 are secured by bolts or other means 2' to the cutter support 30 so that they may be removed and replaced at any time.

It will be understood that for each different shape of blank a cutter must be provided. As many cutters as desired may be used at one time within the limits of the machine and if there are not sufficient cutters to cut out all the blanks of a definite garment, it will be necessary to cut one set of blanks and then change the cutters for the additional blanks. It will be understood, of course, that the machine could be made sufficiently large to accommodate enough cutters to cut the blanks of any possible garment so that at one operation of the machine all the blanks could be cut at one time.

As shown at the left in Fig. 4 and also as shown in Fig. 5, means have been provided for automatically shutting off the power to motors 28 and 37 when they have rotated to their lowermost position. As shown in Fig. 4, there is provided a post or standard 49 which may be secured to base 7 in any desired manner. On this post or standard are arranged switches 50 and 51.

Extending from certain of the traveling nuts 38 and 42, are arms 52 and 53 adapted to strike the switches and move them to open position, whereupon the parts will immediately stop. The switches 50 and 51 are made to remain open by friction or other means and must be manually closed before the cutters or the pressing members can be lowered. As shown in Fig. 5, motor 28 is provided with a reversing switch 54 of any desired or preferred kind which may be actuated manually. Switch 50 is provided with an arm 55 having a sleeve 56 adjustably mounted on the standard 49. The sleeve is rigidly secured in any of its adjusted positons to standard 49 by a suitable set screw 57. Arm 55 carries an insulated contact 58 and is pivotally connected at 59 with a swinging arm 60 carrying an insulated contact 61. Arm 60 has a portion 62 arranged in the path of movement of the arm 53 and has an extension 63 which may be grasped and moved manually. When the arm 53 moves downwardly it will strike the extension 62 and swing the switch to an open position as shown in Fig. 4. This will separate the contacts 58 and 61. A hand-actuated switch 64 is provided for connecting the conductors 65 and 66. The switch 64 may be of any desired kind but it is preferably a switch normally held open by a spring and remains closed only as long as the attendant holds the same closed. The numerals 67 and 68 indicate the lead-in wires to motors 28 and 37 and from the wire 67 a wire 69 leads to the conductor 65, while a wire 70 leads to the switch 54 and to one terminal of the motor 28. Conductor 65 is connected with the contact 61, while conductor 66 is connected with the contact 58.

When the switch 50 is open, as shown in Fig. 4, switch 64 is held closed manually after the reversing switch 54 has been properly set. As long as switch 54 is held closed and switch 50 is open, the motor 28 will function to raise the weight support 43 and associated parts. When these members have been raised to the desired extent, as indicated in Fig. 1, the attendant releases the switch 64 and the same will automatically open. This deprives motor 28 of current as switch 50 is open. When it is desired to lower the weight support 43 and associated parts to the position shown in Fig. 4, the extension 63 is grasped and switch 50 is closed. Before this is done the reversing switch 54 must be properly set. When switch 50 is closed motor 28 will begin to function and will move the weight support 43 and associated parts downwardly until arm 53 strikes the extension 62, whereupon switch 50 will be opened and the weight support 43 and associated parts are stopped.

The switch 51 and associated parts are constructed identically with switch 50 and associated parts but function to move the cutter 2 and associated parts upwardly and downwardly. When the weight support 43 and associated parts have been moved to their lowermost position and the switch 50 opened, the circuit from motor 28 is opened and will remain open until manually closed. To move the weight support 43 and associated parts to an upward position, for instance the dotted position shown in Fig. 1, switch 64 is manually closed and held closed until the parts have been moved upwardly to the desired extent. Switch 64 is then released and automatically opens. Switch 50 is never closed until it is desired to lower the weight support 43 and associated parts. It will be understood, of course, that switch 50 and also switch 51 must be adjusted along the standard 49 to permit a proper opening at the proper time according to the thickness of the pile of fabric 48.

While the machine may be built permanently in a desired place, it is shown as being a separate machine and secured to the table 1 by suitable clamping brackets 71. By reason of its construction, therefore, it may be moved from place to place if desired.

I claim:

1. A machine for cutting fabric into parts ready to be stitched together to form a garment, including a pallet for receiving a pile of fabric to be cut, a base supporting said pallet, a plurality of rotatable posts upstanding from said base, a plurality of pressing members actuated by certain of said posts, power actuated means for moving said certain parts to cause said pressing members to press said pile of fabric against said pallet, a plurality of cutters actuated by others of said posts formed as patterns, power actuated means for actuating said other parts to cause said cutters to pass through said pile of fabric into said pallet and hand-controlled means for causing said power actuated means to move said cutters and said pressing members to non-functioning positions.

2. A machine for cutting fabric into garment blanks including a base provided with a depressed zone, a pallet on said base positioned to fill said depressed zone adapted to receive a pile of sheet fabric, a plurality of cutters shaped like the blanks to be cut, a plurality of threaded posts upstanding from said base, said threaded posts being rotatable, a non-rotatable traveling nut carried by each of said threaded posts, a member secured to all of said nuts, means for securing said cutters to said member, power actuated means for simultaneously rotating said threaded posts for raising and lowering said member and the cutters whereby the cutters may be forced through said pile of sheet fabric for cutting said blanks, and means for holding the pile of sheet fabric in position, said means including a plurality of threaded posts upstanding from said base, said posts being rotatable, a non-rotating traveling nut on each of said posts, a single weight support secured to all of said nuts, a plurality of pressing weights carried by said weight support and power actuated means for rotating said posts for raising and lowering said weight support.

LOUIS KLEIN.